Feb. 14, 1961 H. K. ROBINSON 2,971,408
KNIFE SERRATING APPARATUS
Filed Dec. 10, 1957
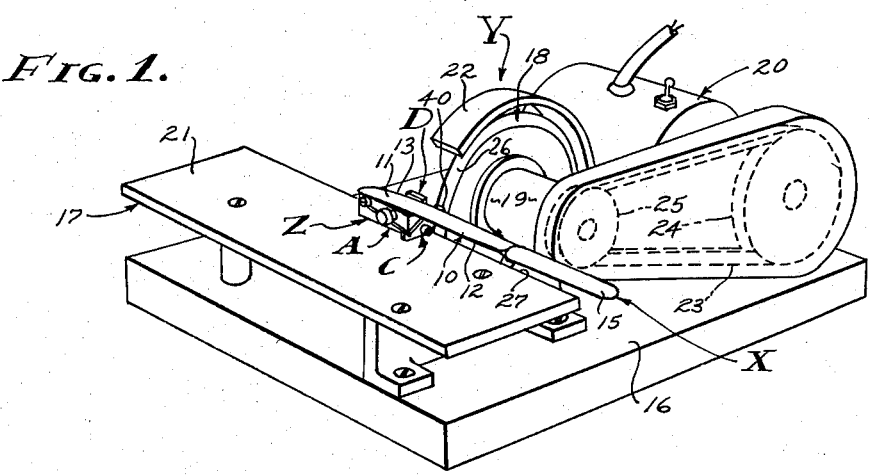
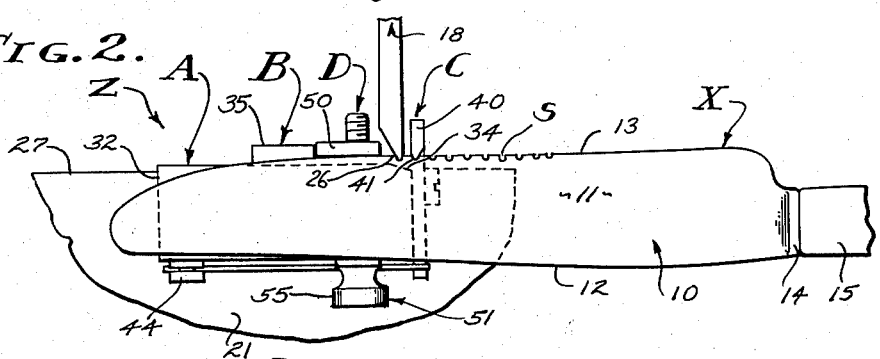
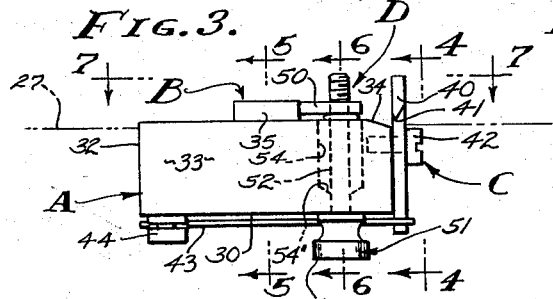
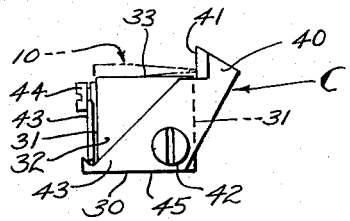
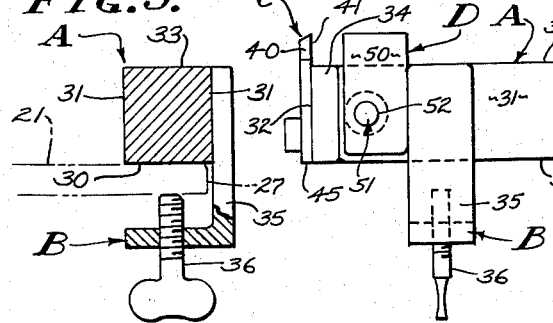
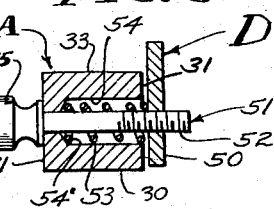
INVENTOR
HOLLY K. ROBINSON
BY
Wm. H. Maxwell
AGENT

United States Patent Office 2,971,408
Patented Feb. 14, 1961

2,971,408

KNIFE SERRATING APPARATUS

Holly K. Robinson, 800 S. Isis Ave., Inglewood, Calif.

Filed Dec. 10, 1957, Ser. No. 701,869

2 Claims. (Cl. 76—89.1)

This invention relates to a knife serrating apparatus and is particularly concerned with an adjustable holder for supporting a knife blade, or the like, in position relative to a grinder for the purpose of serrating the cutting edge thereof, and it is a general object of this invention to provide means for adequately locating and limiting movement of a knife blade to be ground, or shaped, as by means of a grinding wheel.

Knives, and the like, vary widely in size and shape, and are designed for different and special purposes. The usual knife blade has a substantially straight cutting edge defined by converging side walls of the blade, and said edge may vary widely in sharpness depending upon the intended purpose to be filled by the knife. Further, it is desirable, in many cases, to provide serrations along the cutting edge of a knife blade, for the purpose of increasing the cutting action of the blade and so that the blade involves a series of tooth-like projections. The serrations vary in shape, size and spacing, and since a knife blade tends to become dulled, there arises the problem of sharpening the said cutting edge and at the same time to maintain the desired serrations. Also, it may be desired to initially form serrations in a knife blade that has no serrations. Whether new serrations are to be formed or whether old serrations are to be reshaped, difficulties are encountered involving location and depth of cut of the tool used in forming each individual serration. Even with great skill it is not possible to form uniform serrations entirely by hand, although it is a simple and convenient matter to hold a knife blade by hand to be worked upon by a grinding wheel. For example, if a serration is merely misplaced or if it is cut too deep, the knife blade will be permanently injured. However, a knife blade can be conveniently manipulated up to a grinding wheel to be dressed thereby.

An object of this invention is to provide a knife serrating apparatus that properly and readily holds a knife blade in the proper position and which controls the depth of cut to be made by a cutting tool.

Another object of this invention is to provide an apparatus of the character above referred to that is adjustable to accommodate any ordinary knife blade and which can be selectively adjusted as circumstances require.

It is still another object of this invention to provide an apparatus of the character above referred to that is adjustable to control the manual positioning of a knife blade so that said blade is conveniently manipulated for the formation therein and/or resharpening therein of the desired serrations.

The various objects and features of the invention will be fully understood from the following detailed description of a typical preferred form and application of the invention, throughout which description reference is made to the accompanying drawings, in which:

Fig. 1 is a perspective view of the apparatus that I have provided and showing the manner in which a knife blade is positioned by manipulation and serrated thereby. Fig. 2 is an enlarged plan view of a portion of the structure shown in Fig. 1. Fig. 3 is an enlarged plan view of the holder provided by the present invention. Fig. 4 is an end view of the holder and taken as indicated by line 4—4 on Fig. 3. Fig. 5 is a sectional view through the central portion of the holder and taken as indicated by line 5—5 on Fig. 3. Fig. 6 is another sectional view of the holder and taken as indicated by line 6—6 on Fig. 3, and Fig. 7 is a side elevation of the holder and taken as indicated by line 7—7 on Fig. 3.

The present invention involves, generally, a knife blade X to be serrated or re-serrated, a cutting or dressing tool Y for acting on the cutting edge of the knife blade, and a holder Z for positioning and controlling of the knife blade to be acted upon. Since a grinding wheel is the usual and most practical device for removing hardened material from an object, such as a tempered steel blade or knife, I have employed a grinder type cutting tool Y, and I have provided a holder Z that is adapted to be used in conjunction with the tool Y, as shown. Further, the holder Z is adaptable to many differenet sizes and varieties of knives, and therefore, the invention is not to be limited to the serrating or re-serrating of the particular size and shape of knife illustrated in the drawings.

The knife blades X, as pointed out above, vary in size and shape, and in the drawings I have illustrated a typical blade X that is formed of a flat elongate body 01 of suitable metal, for example hardened steel. The body 10 has substantially flat side walls 11 that converge from the back 12 to the cutting edge 13. As shown, the cutting edge 13 is substantially straight but it may be curved, as it is shown curved toward the tip of the blade. The body 10 is reinforced at 14 to be supported by a handle 15. It is to be understood that the cutting edge is sharpened as required.

When serrations are to be incorporated in the knife blade X they are shaped in the cutting edge 13 to form a series of tooth-shaped projections each with its cutting edge 13. The serrations may be large or small, they may be wide or narrow, and they may be shallow or deep, all as circumstances require. In any case, the serrations are evenly spaced and are of uniform formation. For example, they may be half-round openings cut into the cutting edge 13, as shown, or they may be V shaped, all as required.

The cutting or dressing tool Y is provided for acting on the cutting edge 13 of the knife blade X, and is preferably a grinder type cutting tool involving, generally, a base 16, a table 17, a grinding wheel 18 rotatably carried on an arbor 19, and a drive 20 for the wheel 18. The base 16 may be of any suitable size or shape and is shown as a flat rectangular element that supports the remainder of the structure. The table 17 is carried by the base 16 and is a horizontally disposed table having a flat top surface 21. As shown, the table 17 is elongate and extends transversely of the base 16 at the forward end thereof.

The wheel 18 is preferably an abrasive or Carborundum wheel and is rotatably carried on a horizontal axis at the back side of the table 17, the said axis being spaced above the plane of the surface 21 and spaced rearwardly from the back edge of the table 17. The arbor 19 that rotatably carries the wheel is provided with anti-friction bearing means so that the wheel 18 can be rotated at high speeds. As illustrated a guard 22 is provided that partially covers the wheel for protection of the person operating the apparatus. The drive 20 is shown as an electric motor drive and is coupled to the wheel 18 and arbor 19 by a belt 23 operating over suitable pulleys 24 and 25. As clearly illustrated in Figs. 1 and 2 of the drawings, the periphery 26 of the wheel 18 is suitably shaped or dressed and is positioned close to the back edge 27 of the table 17.

The holder Z in accordance with the present invention, is provided to support any one of a variety of knives or knife blades X in a position to be engaged and operated upon by the wheel 18 of the dressing tool Y. As shown, the holder Z supports the knife blade X in a position above the plane of the table surface 21, and in a position rearward of the back edge 27 to be engaged by the periphery of the wheel 18. The holder Z involves, generally, a frame A, means B mounting the frame A on the table 17, a blade positioning means C, and a blade stop means D. The frame A carries and supports the working parts of the holder Z while the means B secures the frame A in a selected working position. The blade positioning means C acts to longitudinally locate the blade X in a position to receive cutting action from the wheel 18, and the blade stop means D acts to adjustably control the depth of the cut of the wheel 18 into the body 10 of the knife blade X at the cutting edge 13.

The frame A, as best illustrated in Fig. 3 of the drawings, is a horizontally disposed part adapted to have supporting engagement on the top surface 21 of the table 17. The frame A is freely movable or shiftable relative to the table 17 so that it can be selectively positioned as required and is normally movable in any direction in a horizontal plane parallel with the plane of the top surface 21. The frame A, is preferably substantially elongate and has a flat bottom 30 for engagement with the top 21 of the table 17. In the particular case illustrated, the frame A is substantially square in cross section and has parallel sides 31 and ends 32 normal to the bottom 30. The frame A also has a top 33 that is parallel with the bottom 30, and the side 31 facing the wheel is chamfered at 34 in order to allow clearance at the periphery of the wheel (see Fig. 2). In carrying out the invention, the top 33 is at about the level of the axis of the arbor 19 and wheel 18 (see Fig. 1).

The means B that secures the frame A in a selected working position mounts the frame on the table 17. The means B is preferably a clamping means and involves an arm 35 that projects from and underlies the frame A. As shown, the arm 35 is secured to a side wall 31 of the frame and extends downwardly from the frame in the plane of said side wall. The arm 35 has a portion that is turned at a right angle to project transverse of the frame A underlying the bottom 30 thereof. The said transversely extending portion of the arm 35 is spaced from the bottom 30 and threadedly carries a thumb screw 36 or the like adapted to engage with the underside of the table 17. The screw 36 is vertically disposed and the terminal end thereof is engageable with the underside of the table 17 to clamp the frame A in position as circumstances require.

The blade positioning means C acts to longitudinally locate the blade X in a position to receive cutting action from the wheel 18 when the body 10 of the knife blade X is positioned to overlie the frame A to be supported by the top 33 thereof. That is, the means C is adapted to cooperate with the blade X when the blade is properly manipulated into a working position relative to the frame A. The said proper position involves orienting the body 10 so that it extends longitudinally of the frame A and with the side walls 11 thereof substantially parallel with the top 33 of the frame, and with the cutting edge 13 pointed toward or facing the wheel 18. It is to be observed that the blade X is not connected to or with any part of the apparatus, but is simply engaged therewith or thereby to be positioned and controlled as it is manipulated.

The blade positioning means C involves a finger 40 that projects from the frame A to engage in the openings S that are formed in the body 10 of the blade X by the wheel 18. The finger 40 projects upwardly from one end 32 of the frame A and extends above the plane of the top 33. The finger has a vertically disposed guiding edge 41 normally at about the plane of the side wall 31 of the frame A and positioned to oppose the cutting edge 13 of the blade X. Thus, the cutting edge 13 is engageable with the edge 41 of the finger 40 when the blade X overlies the top 33 of the frame, as above described.

In accordance with the invention, the finger 40 is a shiftable part adapted to yield to movement of the blade X in a direction transverse of the frame A, or toward the wheel 18. In the preferred form of the invention the finger 40 is pivoted to the end of the frame A on a pin 42 and is spring biased to a normal retracted position, as shown throughout the drawings. A suitable spring 43, anchored at 44, engages the finger 40 to yieldingly urge the finger to said normal position wherein the edge 41 is vertically disposed at about the plane of the side wall 31. The finger is shown stopped in said normal position by means of the lower end 45 thereof which has stopping engagement with the top surface 21 of the table 17 when the holder Z is in operating position.

The blade stop means D acts to adjustably control the depth of cut of the wheel 18 as it acts to cut into the cutting edge 13 of the blade X when the blade is positioned to overlap the top 33 of the frame A. That is, the means D, like the means C, is adapted to cooperate with the blade X when the blade is properly manipulated into working position relative to the frame A, as above set forth. More specifically, the means D acts to limit forward motion of the blade X in a direction transverse of the frame A and toward the wheel 18.

The blade stop means D involves a stop plate 50 and means 51 adjustably positioning the plate 50 relative to the frame A. In accordance with the form of invention under consideration the side wall 31 is in the plane to which the edge 41 is normally retracted, and which may be considered the normal retracted position, and this is also the normal retracted position of the cutting edge 13 before it is advanced into engagement with the wheel 18. Therefore, the stop plate may be positioned at the plane of the wall 31 or laterally spaced therefrom toward the wheel 18, as shown.

The stop plate 50 is a flat part that projects substantially above the plane of the top 33 of the frame A. In practice, the arm 35 of the means B has guiding engagement with the plate 50 (see Fig. 7) in order to prevent turning thereof. The means 51 that adjustably positions the plate may vary widely and is shown as a screw means involving a thumb screw 52 threadedly engaged with the plate 50 and a spring 53 holding the screw and plate in tension. The screw 52 extends through an opening 54 extending transversely through the frame A there being a head 55 on the screw and having bearing engagement with one side wall 31 of the frame. The other end of the screw 52 projects from the opening 54 to threadedly carry the plate 50 and the spring 53 is carried in the opening 54 and engaged with a seat 54' to yieldingly urge the plate 50 away from the frame A, as shown.

From the foregoing, it will be apparent that the holder Z that I provide is a very simple piece of apparatus that involves but a few simple easily formed parts. In order to use the holder Z for the purpose of serrating knife blades X, the holder Z is clamped in position by the means B so that the finger 40 of the positioning means C is adjacent the periphery of the wheel 18, for example to the right thereof. The finger 40 is positioned one increment, as shown in Fig. 2 of the drawings, from the wheel 18 with the wheel 18 entered between the finger 40 and adjacent the edge of the plate 50. Each time a serration opening S is cut into the cutting edge 13, the blade X is stepped over by manipulation so that the next serration can be cut, the preceeding serration being engageable with the finger 40 to index or position the blade X longitudinally. It will be seen how the spring biased finger 40 of the means C will allow the blade X to be shifted forwardly from a retracted position to have cutting engagement with the wheel 18.

With the holder Z that I provide, the blade X is not only incrementally positioned in exact relation to the wheel 18 but it is also limited in its forward travel relative to the wheel 18. The positioning of the increments is easily adjusted by shifting the holder Z bodily relative to the wheel 18, and the depth of cut is easily adjusted by shifting the plate 50 by turning the screw 52.

The wheel 18 of the cutting tool Y is dressed to properly form each individual set serration S, as circumstances require, and it is continuously rotated at operating speed. The knife blade X is manipulated to have supporting engagement with the frame A and is brought into engagement, first with the positioning means C and second with the stop means D. In the process of engaging the blade X with the stop means D, the wheel 18 engages the edge 13 to form the serrations S therein.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A knife serrating apparatus of the character described including, a dressing tool having a flat horizontally disposed table and a wheel on an axis spaced laterally of the table, and a holder for positioning and controlling manipulated movement of the knife blade in a plane spaced above the table and to be engaged by the wheel and including, a frame to be carried by the table, means adjacent the side of the wheel and engaged by the blade and longitudinally positioning the blade relative to the frame and wheel, and means stopping lateral movement of the blade toward the wheel and including, a plate engaged by the blade and positioned laterally of the frame, an adjustment screw rotatably supported by the frame and threadedly carrying and positioning the plate, and a compression spring acting between the frame and plate to urge said plate into position.

2. A holder for positioning and controlling manipulated movement of a knife blade, and the like, for serration of the cutting edge thereof, and including, a frame means engaged by the cutting edge and longitudinally positioning the blade relative to the frame, and means stopping lateral movement of the blade relative to the frame and including, a plate engaged by the blade and shiftable laterally of the frame, an adjustment screw rotatably supported by the frame and threadedly carrying and positioning the plate, and a compression spring acting between the frame and plate to urge said plate into position.

References Cited in the file of this patent

UNITED STATES PATENTS

| | | |
|---|---|---|
| 205,847 | Fairbanks | July 9, 1878 |
| 776,255 | Pangborn | Nov. 29, 1904 |
| 1,295,156 | Gorham | Feb. 25, 1919 |
| 1,875,163 | Scharff | Aug. 30, 1932 |
| 2,510,301 | Weigand | June 6, 1950 |
| 2,623,416 | Sasse | Dec. 30, 1952 |
| 2,713,236 | Goss | July 19, 1955 |
| 2,786,310 | Jansson | Mar. 26, 1957 |